(No Model.)  2 Sheets—Sheet 1.

P. H. GRIFFIN.
DEVICE FOR TESTING CAR WHEELS.

No. 421,271.  Patented Feb. 11, 1890.

Witnesses:  Inventor.

(No Model.) 2 Sheets—Sheet 2.
P. H. GRIFFIN.
DEVICE FOR TESTING CAR WHEELS.
No. 421,271. Patented Feb. 11, 1890.
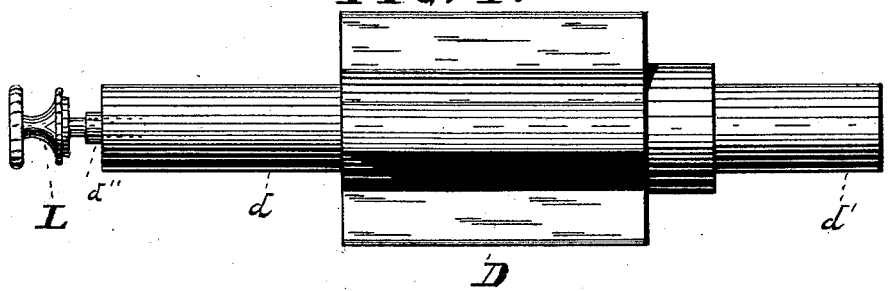
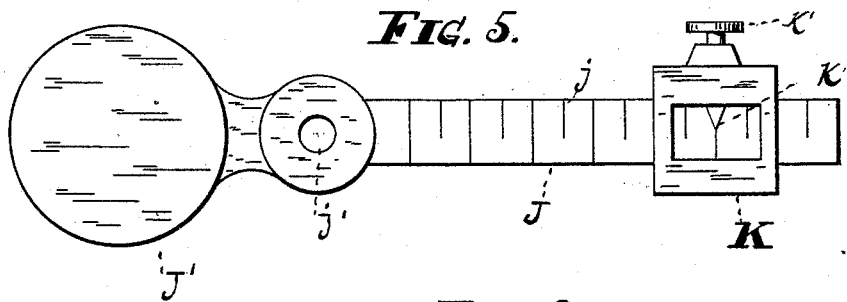
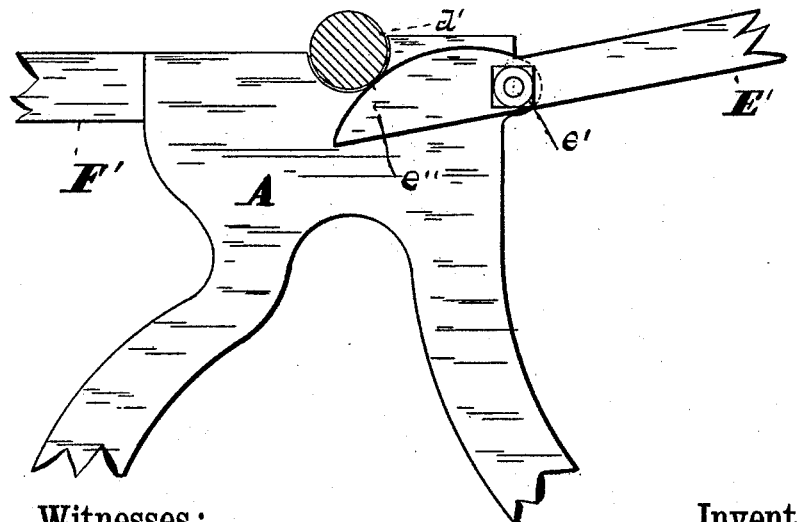

UNITED STATES PATENT OFFICE.

PATRICK HENRY GRIFFIN, OF BUFFALO, NEW YORK.

DEVICE FOR TESTING CAR-WHEELS.

SPECIFICATION forming part of Letters Patent No. 421,271, dated February 11, 1890.

Application filed June 14, 1889. Serial No. 314,287. (No model.)

*To all whom it may concern:*

Be it known that I, PATRICK HENRY GRIFFIN, of Buffalo, in the county of Erie and State of New York, have invented certain new and useful Improvements in Car-Wheel-Testing Devices; and I do hereby declare that the following description of my said invention, taken in connection with the accompanying sheet of drawings, forms a full, clear, and exact specification, which will enable others skilled in the art to which it appertains to make and use the same.

This invention has general reference to devices for testing car-wheels; and it consists, essentially, in the novel and peculiar combination of parts and details of construction, as hereinafter first fully set forth and described, and then pointed out in the claims.

Figure 1:
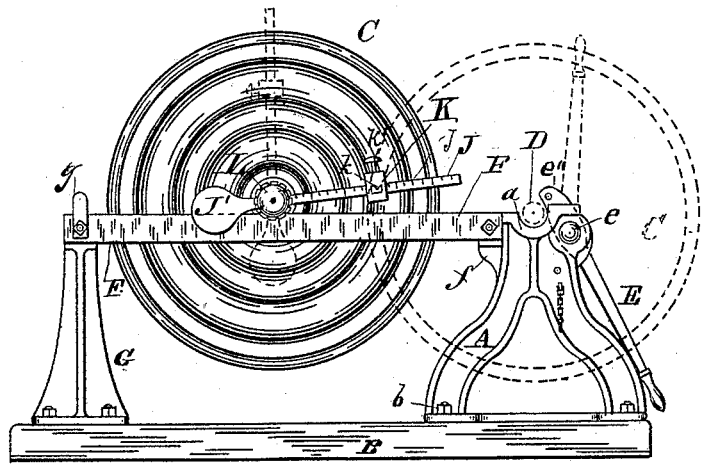
Figure 2:
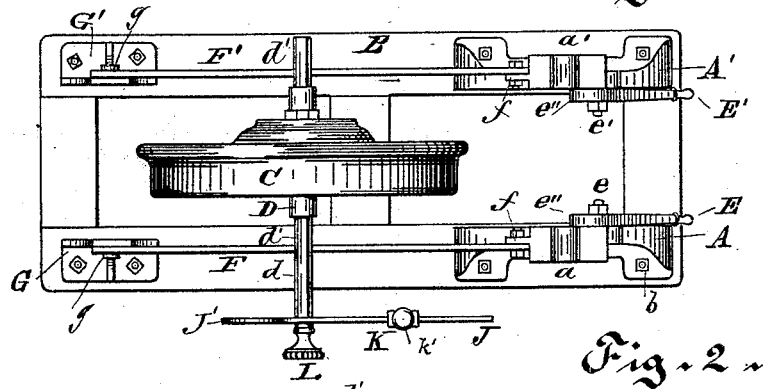
Figure 3:
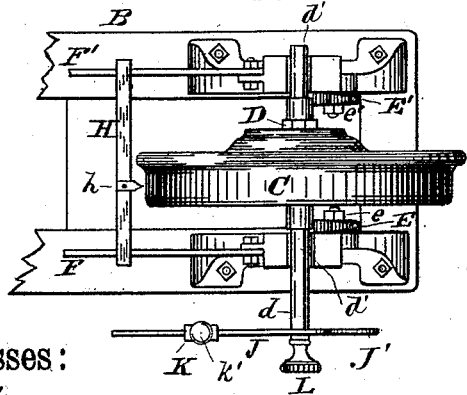

In the drawings already mentioned, which serve to illustrate my said invention more fully, Figure 1 is a side elevation of my improved car-wheel-testing device. Fig. 2 is a plan of the same. Fig. 3 is a similar view showing the wheel in position for testing its correctness of tread. Fig. 4 is a plan of the mandrel, and Fig. 5 a similar view of the pointer-bar detached. Fig. 6 is an elevation of a portion of the standard, the mandrel, and one of the levers for lifting the mandrel out of its bearings.

Like parts are designated by corresponding letters of reference in all the figures.

The object of this invention is the production of a convenient and serviceable device for testing the truth and correctness of car-wheels. To accomplish this result, I construct my testing device essentially of two standards A A', securely fastened upon a base B by bolts $b$, as shown, said standards having in their upper faces semicircular bearings $a$ $a'$, to receive a spindle or mandrel D, upon which the car-wheel C is placed. To the standards and on the forward side of the bearings $a$ $a'$ there are pivoted two levers E E' by stud-bolts $e$ $e'$, the long arm of which has handles, while the opposite end terminates in a curved portion $e''$, as illustrated in Fig. 1. To the rear of the bearings the standards A A' have lugs $f$, to which are secured horizontally-arranged ways F F', having on their ends stops $g$, these ends being supported upon standards G G', as clearly shown in the figures.

Upon the ways F F' there is removably placed a bar H, having a pointer $h$, wherewith to test the tread of the car-wheel for rotundity, as hereinafter to be referred to.

D is a mandrel. It has journals $d'$, which engage the bearings $a$ $a'$, respectively, and a shank $d$, to the end of which is secured an indicator-bar J, having in its face division-marks $j$, and upon its bar a slide K, provided with a pointer $k$, Fig. 1, and a thumb-screw $k'$, wherewith the said slide may be attached anywhere on the rod J. This rod, as shown in detail in Fig. 5, has an eye $j'$, fitting a reduced portion $d''$ on the end of the mandrel D, (see Fig. 4,) so as to allow it to be affixed to said mandrel by simply turning and tightening the thumb-screw L.

In operation the car-wheel to be tested is put upon the mandrel D and the latter placed into the bearings $a$ $a'$, and the bar H, with its pointer $h$, brought close up to the tread of the wheel, so that when the latter is rotated it will show any deviation from the exact roundness as well as eccentricity of the same. If, now, the wheel is to be tested for balance, the hand-levers E E' are depressed, which will cause the curved short arms to lift the mandrel out of the bearings $a$ $a'$, and, owing to said curved form, give sufficient impetus to the wheel to cause it to revolve upon the ways a sufficient distance to determine at once whether or not the wheel is in balance. If the wheel is in balance, it will, when started with sufficient force, travel to the end of the ways and come to rest at the end stops $g$; but when out of balance the heavier portion will overcome the momentum of the moving wheel and thereby assume a swinging motion not at all unlike that of a pendulum until it finally comes to rest with the heavier portion pending downward, according to the well-known law of gravitation. To now ascertain the amount of matter that is out of balance, the slide K is moved upon the bar J (after the latter has first been allowed to assume a pending position by unscrewing the thumb-screw L and then tightening the same again) toward or from the center of the mandrel, and the wheel revolved until a perfect equilibrium of the parts is attained, when, in accordance with the position of the slide K, the exact amount which the wheel is out of balance will be shown by the pointer, and which amount depends upon the weight of said slide and the distance from the center which it occupies upon the bar. If now desired, the wheel can be readily balanced and then removed from the mandrel or returned to its bearings $a\ a'$, where, by raising the handles E E', so that the journals are received by the curved arms $e''$, the wheel is allowed to drop easily and carefully into its bearings.

The indicator-bar J is of itself in balance—that is to say, it has a counterpoise J' so arranged and adapted as to perfectly balance the bar J—so that the weight of the poise K and its distance from the center of the mandrel D enters into consideration only in determining the amount which the wheel is out of balance. The scale-indications are empirical, they having been based upon experiments carried on by me and the maximum and minimum of the variations as found in car-wheels of my manufacture. They can, however, be varied to accommodate different conditions without change or modifications.

To rotate the wheel in its bearings, the indicator-bar J may be conveniently used, though other means, which will readily suggest themselves, may be resorted to to accomplish the object in view.

Having thus fully described my invention, what I claim as new, and desire to secure to me by Letters Patent, is—

1. As an improved article of manufacture, a wheel-testing device consisting, essentially, of a base, two sets of standards, two parallel ways, and a mandrel, said standards having levers and bearings, as described, whereby said wheel may be tested either upon the ways or upon the bearings, as stated.

2. In car-wheel-testing devices, the combination, with suitable standards and ways, of bearings for revolving said wheel to test its rotundity, and levers for lifting the wheel with its mandrel out of said bearings upon said ways, as and for the purpose stated.

3. The combination, with the base B, of the standards A A' and G G', the parallel ways secured to said standards, the mandrel D, having journals $d\ d'$, and the levers E E', with their short arms $e''$, said standards A A' having the bearings $a\ a'$, as and for the purpose stated.

4. The combination, with the standards having bearings, as described, of the parallel ways and the levers having their short arms curved, as stated.

In testimony that I claim the foregoing as my invention I have hereto set my hand in the presence of two subscribing witnesses.

PATRICK HENRY GRIFFIN.

Attest:
MICHAEL J. STARK,
WM. O. STARK.